G. R. HOHORST.
SECURING MEANS FOR BOLTS.
APPLICATION FILED JAN. 10, 1917.

1,238,915.

Patented Sept. 4, 1917.

Witnesses
Albert C. Leitch
James Stanley

Inventor
George Rudolph Hohorst.
By his Attorneys,
Clements & Clements.

UNITED STATES PATENT OFFICE.

GEORGE R. HOHORST, OF NEW YORK, N. Y.

SECURING MEANS FOR BOLTS.

1,238,915.   Specification of Letters Patent.   Patented Sept. 4, 1917.

Application filed January 10, 1917. Serial No. 141,585.

*To all whom it may concern:*

Be it known that I, GEORGE RUDOLPH HOHORST, a citizen of the United States, residing at New York, in the county of Queens and State of New York, have invented new and useful Improvements in Securing Means for Bolts, of which the following is a specification.

My invention relates to improvements in securing means for axles, shafts, bolts, and the like, and more particularly to means for preventing rotation and longitudinal or endwise movement of the latter.

The object of my invention is to provide an extremely simple, cheap and efficient securing means to take the place and perform the functions of the usual bolt-head, nut, cotter pin, and key or feather.

A further object is the provision of a removable and positive securing means of the character described that will, when fitted, present a perfectly smooth outer surface free from projecting nuts and bolt-heads.

With the foregoing and other objects in view my improvements consist, broadly speaking, in the combination with a shaft or bolt having a transverse orifice, of a securing pin inserted in the orifice and forced into diverging or oblique channels provided in the housing or shaft support.

Before describing my improvements specifically I wish it expressly understood that while I have shown the device in connection with a metal block, I do not limit myself to this single application of the invention, it being obvious that it may be used in connection with many other mechanisms without departing from the spirit or scope of the invention as defined in the appended claims wherein I do not limit myself as to size, proportions, or material employed.

In the drawings which accompany this application and constitute a part thereof, Figure 1 is a side view of a form of block with my improvement applied.

Figure 1:
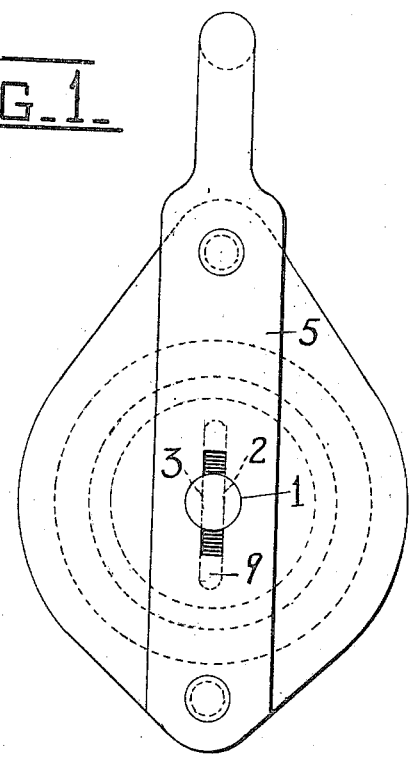
Figure 2:
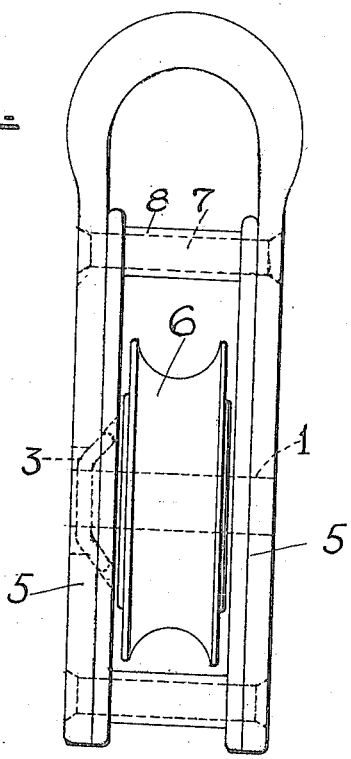
Fig. 2 is a side elevation of the same.
Figure 3:
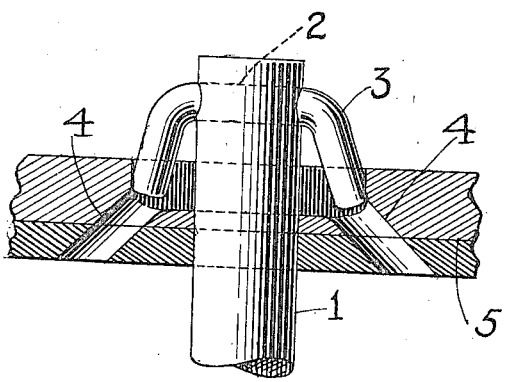
Fig. 3 is an enlarged view illustrating the securing pin inserted through the shaft or bolt and in a position ready to be driven or forced home into the diverging or oblique channels of the shaft support.
Figure 4:
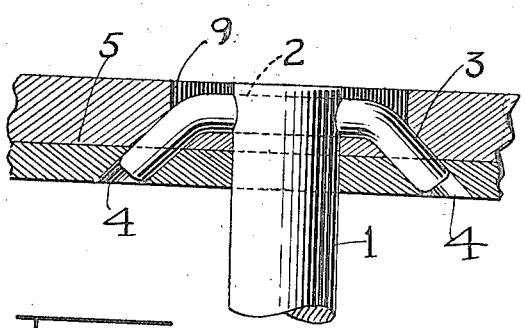
Fig. 4 is a view similar to Fig. 3 in which all the parts are shown in their relative positions after having been driven home and the protruding end of the shaft or bolt finished off, leaving only sufficient metal to prevent the pin from being ripped out of the head of the shaft.

Referring more specifically to the drawings in which like characters of reference are used to indicate like parts in the several views, the numeral 1 designates a shaft or bolt having near one end a transverse hole 2 in which is inserted a securing pin 3, while 4 indicates diverging or oblique channels which extend through the housing or shaft supporting means 5 and communicate with a recess 9 in the outer face of the housing. The parts 6, 7, and 8 are the ordinary elements of a standard block that require no detailed description, not being pertinent to the present invention.

It is to be understood that the improvement may not only be used in connection with fixed shafts but also with shafts that require periodical or occasional removal, as the securing pin, being of medium steel (or any other material I may elect), will have sufficient pliability to allow it to yield and release the shaft when sufficient force is properly applied. The size of the securing pin will of course depend upon the purpose for which it is used and the amount of torque and end thrust to which the shaft may be subjected.

Having described my invention, its construction and advantages, I claim as new and desire to secure by Letters Patent of the United States:—

1. In a device of the character described, the combination of a shaft, a support for the shaft provided with a bearing to receive the shaft and with oblique or diverging channels oppositely disposed about said bearing, and a securing pin engaging said shaft and said channels.

2. In a device of the character described, the combination of a shaft having a transverse aperture therethrough, a support for the shaft provided with a bearing to receive the shaft and oblique or diverging channels oppositely disposed about said bearing, and a distortable securing pin inserted in said aperture and having its opposite ends engaging said channels.

3. In a device of the character described, the combination of a shaft, a support for the shaft provided with a bearing to receive the shaft and with a recess in the face thereof and with diverging or oblique channels oppositely disposed about said bearing and a securing pin engaging said shaft, adapted to be received in said recess, and its opposite ends forced into said channels.

4. In a device of the character described, the combination of a shaft having a transverse aperture therethrough, a support for the shaft provided with a bearing to receive the shaft and a recess in the face thereof and with diverging or oblique channels oppositely disposed about said bearing and a distortable securing pin inserted in said aperture and adapted to be received in said recess and its opposite ends forced into said channels.

In testimony whereof I, GEORGE RUDOLPH HOHORST, have signed my name to this specification, in the presence of two subscribing witnesses, this fourth day of January, 1917.

GEORGE R. HOHORST.

Witnesses:
HENRY E. GREEN,
EUGENE TWOMEY.